(12) United States Patent
Lin et al.

(10) Patent No.: US 12,267,840 B2
(45) Date of Patent: Apr. 1, 2025

(54) INFORMATION TRANSMISSION METHOD, APPARATUS, DEVICE AND STORAGE MEDIUM

(71) Applicant: GUANGDONG OPPO MOBILE TELECOMMUNICATIONS CORP., LTD., Guangdong (CN)

(72) Inventors: Yanan Lin, Dongguan (CN); Zuomin Wu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 435 days.

(21) Appl. No.: 17/547,041

(22) Filed: Dec. 9, 2021

(65) Prior Publication Data
US 2022/0104247 A1 Mar. 31, 2022

Related U.S. Application Data

(63) Continuation of application No. PCT/CN2019/124397, filed on Dec. 10, 2019.

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC ............. H04W 72/23; H04W 72/0446; H04L 1/1854; H04L 1/1864; H04L 1/1861; H04L 5/0053
See application file for complete search history.

(56) References Cited

U.S. PATENT DOCUMENTS

2019/0239216 A1* 8/2019 Kundu ................. H04W 72/21
2019/0349142 A1 11/2019 Aiba et al.
(Continued)

FOREIGN PATENT DOCUMENTS

CN 108702768 A 10/2018
CN 110521269 A 11/2019
(Continued)

OTHER PUBLICATIONS

Intel Corporation, "Enhancements to HARQ for NR-unlicensed", R1-1904287 3GPP TSG RAN WG1 Meeting #96bis, Xian, China, Apr. 8-12, 2019 (Year: 2019).*
(Continued)

*Primary Examiner* — Austin J Moreau
(74) *Attorney, Agent, or Firm* — Ladas & Parry, LLP

(57) ABSTRACT

An information transmission method, apparatus, a device and a storage medium, where the method is applied to a terminal device and includes: receiving a first DCI, where the first DCI indicates the terminal device to send feedback information corresponding to a first channel group within a target time unit; receiving a second DCI, where the second DCI indicates the terminal device to send the feedback information corresponding to a second channel group within the target time unit; sending target feedback information within the target time unit, where the target feedback information includes the feedback information corresponding to the second channel group. According to the method, it ensures consistent understandings for transmission channels and the feedback information between the network device and the terminal device, thereby ensuring that the network device can receive the feedback information of the terminal device correctly, thereby improving a transmission performance of uplink control information.

17 Claims, 9 Drawing Sheets

(56) References Cited

U.S. PATENT DOCUMENTS

| | | | |
|---|---|---|---|
| 2021/0006356 A1* | 1/2021 | Khoshnevisan | H04L 1/1621 |
| 2021/0337536 A1* | 10/2021 | Li | H04W 72/569 |
| 2022/0408486 A1* | 12/2022 | Liang | H04W 72/0453 |
| 2023/0208561 A1* | 6/2023 | Saber | H04L 1/1896 370/329 |

FOREIGN PATENT DOCUMENTS

| | | |
|---|---|---|
| EP | 3905573 A1 | 11/2021 |
| WO | 2017193336 A1 | 11/2017 |
| WO | 2018152790 A1 | 8/2018 |
| WO | 2018170656 A1 | 9/2018 |
| WO | 2019047019 A1 | 3/2019 |
| WO | 2021/114108 A1 | 6/2021 |

OTHER PUBLICATIONS

The first Office Action and search report of corresponding Chinese application No. 202110772909.9, dated Nov. 25, 2022 with machine translation by Google translate.

Nokia, Nokia Shanghai Bell, "HARQ scheduling and feedback for NR-U", R1-1904183,3GPP TSG RAN WG1 Ad-Hoc Meeting #96bis,Xi'an, China, Apr. 8-12, 2019, entire document.

Intel Corporation, "Enhancements to HARQ for NR-unlicensed", R1-1904287,3GPP TSG RAN WG1 Meeting #96bis, Xi'an, China, Apr. 8-12, 2019, entire document.

International Search Report (ISR) dated Sep. 16, 2020 for Application No. PCT/CN2019/124397, and its English translation provided by WIPO.

Written Opinion dated Sep. 16, 2020 for Application No. PCT/CN2019/124397, and its English translation provided by Google Translate.

Huawei, R1-1913288; Feature lead summary#1 of HARQ enhancements for NR-U, 3GPP TSG RAN WG1 Meeting #99, Reno, USA, Nov. 18-22, 2019, entire document.

Huawei, R1-1913418; Feature lead summary#2 of HARQ enhancements for NR-U, 3GPP TSG RAN WG1 Meeting #99, Reno, USA, Nov. 18-22, 2019, entire document.

Huawei, R1-1913561; Feature lead summary#3 of HARQ enhancements for NR-U, 3GPP TSG RAN WG1 Meeting #99, Reno, USA, Nov. 18-22, 2019, entire document.

The EESR of corresponding European application No. 19955894.1, dated Feb. 23, 2023.

The EPO search Report and opinion of corresponding European application No. 19955894.1, dated Jun. 9, 2023.

* cited by examiner

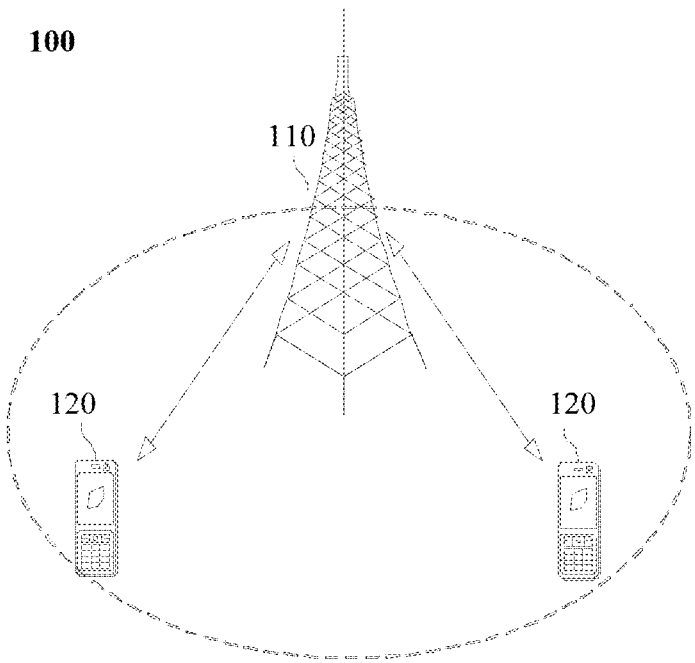

FIG. 1

Receiving a first downlink control signaling DCI, where the first DCI indicates a terminal device to send feedback information corresponding to a first channel group within a target time unit — S210

Receiving a second DCI, where the second DCI indicates the terminal device to send feedback information corresponding to a second channel group within the target time unit — S220

Sending target feedback information within the target time unit, where the target feedback information includes the feedback information corresponding to the second channel group — S230

FIG. 2

INFORMATION TRANSMISSION METHOD, APPARATUS, DEVICE AND STORAGE MEDIUM

CROSS-REFERENCE TO RELATED APPLICATION

This application is a continuation of International Application No. PCT/CN2019/124397, filed on Dec. 10, 2019, the disclosure of which is hereby incorporated by reference in its entirety.

TECHNICAL FIELD

The present disclosure relates to the field of communication technologies and, in particular, to an information transmission method, apparatus, a device and a storage medium.

RELATED ARTS

In a New Radio (NR) standard Rel-16, for a NR-based access to unlicensed spectrum (NR-U), which supports a feedback method based on an acknowledgement/negative acknowledgement (ACK/NACK) of two channel groups.

In current technical solutions, a network device, such as a base station, sends downlink control information (DCI) to a terminal device, indicating channel group information to which a physical downlink shared channel (PDSCH) scheduled by the DCI belongs, or indicating the channel group information to which a physical downlink control channel (PDCCH) carrying the DCI belongs. Further, if the base station sends the DCI to the terminal device, the DCI indicates the terminal device to feed back ACK/NACK information corresponding to a certain channel group, then the terminal device will feed back feedback information corresponding to the PDSCH or PDCCH belonging to the channel group to the base station together. The base station can trigger the terminal device to feed back the ACK/NACK information of a certain channel group multiple times, that is, realize an ACK/NACK retransmission.

However, when the terminal device receives two DCI for a same time unit (for example, a slot), if the two DCI signaling indicates the terminal device to feed back the feedback information of different channel groups, it will cause inconsistent understandings of transmission channels and the feedback information between the base station and the terminal device, and cause the base station to fail to receive the feedback information of the terminal device correctly, which in turn cause a transmission performance of uplink control information to decrease, and affects the communication efficiency of a communication system.

SUMMARY

Embodiments of the present disclosure provide an information transmission method, apparatus, a device and a storage medium.

In a first aspect, an embodiment of the present disclosure provides an information transmission method, which is applied to a terminal device, and the method includes: receiving a first downlink control information (DCI), where the first DCI indicates the terminal device to send feedback information corresponding to a first channel group within a target time unit; receiving a second DCI, where the second DCI indicates the terminal device to send feedback information corresponding to a second channel group within the target time unit; and sending target feedback information within the target time unit, where the target feedback information includes the feedback information corresponding to the second channel group.

In a second aspect, an embodiment of the present disclosure provides an information transmission method, which is applied to a network device, and the method includes: sending a first downlink control information (DCI), where the first DCI indicates a terminal device to send feedback information corresponding to a channel group within a target time unit; sending a second DCI, where the second DCI indicates the terminal device to send feedback information corresponding to a second channel group within the target time unit; and receiving target feedback information sent within the target time unit, where the target feedback information includes the feedback information corresponding to the second channel group.

In a third aspect, an embodiment of the present disclosure provides an information transmission apparatus, which is applied to a terminal device, and the apparatus includes: a first receiving module, configured to receive a first downlink control information (DCI), where the first DCI indicates the terminal device to send feedback information corresponding to a first channel group in a target time unit; a second receiving module, configured to receive a second DCI, where the second DCI indicates the terminal device to send feedback information corresponding to a second channel group within the target time unit; and a sending module, configured to send target feedback information within the target time unit, where the target feedback information includes the feedback information corresponding to the second channel group.

In a fourth aspect, an embodiment of the present disclosure provides an information transmission apparatus, which is applied to a network device, the apparatus includes: a first sending module, configured to send a first downlink control information (DCI), where the first DCI indicates a terminal device to send feedback information corresponding to a first channel group in a target time unit; a second sending module, configured to send a second DCI, where the second DCI indicates the terminal device to send the feedback information corresponding to a second channel group within the target time unit; and a receiving module, configured to receive target feedback information sent within the target time unit, where the target feedback information includes the feedback information corresponding to the second channel group.

In a fifth aspect, an embodiment of the present disclosure may provide a terminal device, including: a processor, a memory, a receiver and an interface for communicating with a sending end device; the memory stores computer-executable instructions; the processor executes the computer-executable instructions stored in the memory, enables the processor to execute the information transmission method provided in any one of the first aspect.

In an implementation, in a specific implementation of the terminal device, the foregoing processor may be a chip.

In a sixth aspect, an embodiment of the present disclosure may provide a network device, including: a processor, a memory, a transmitter and an interface for communicating with a terminal device; the memory stores computer-executable instructions; the processor executes the computer-executable instructions stored in the memory, enables the processor execute the information transmission method provided in any one of the first aspect.

In an implementation, the foregoing processor may be a chip.

In a seventh aspect, embodiments of the present disclosure may provide a computer-readable storage medium, where the computer-readable storage medium stores computer-executable instructions, and the computer-executable instructions are used to implement the information transmission method provided by any one of the first aspect when executed by a processor.

In an eighth aspect, an embodiment of the present disclosure may provide a computer-readable storage medium, where the computer-readable storage medium stores computer-executable instructions, and the computer-executable instruction are used to implement the information transmission method provided by any one of the second aspect when executed by a processor.

In a ninth aspect, an embodiment of the present disclosure provides a program, where the program is used to execute the information transmission method provided in any one of the first aspect when executed by a processor.

In a tenth aspect, an embodiment of the present disclosure provides a program, where the program is used to execute the information transmission method provided in any one of the second aspect when executed by a processor.

In an eleventh aspect, an embodiment of the present disclosure provides a computer program product, including program instructions, the program instructions are used to implement the information transmission method provided by any one of the first aspect.

In a twelfth aspect, an embodiment of the present disclosure provides a computer program product, including program instructions, the program instructions are used to implement the information transmission method provided by any one of the second aspect.

In a thirteenth aspect, an embodiment of the present disclosure provides a chip, including a processing module and a communication interface, and the processing module can execute the information transmission method provided by any one of the first aspect.

In a fourteenth aspect, an embodiment of the present application provides a chip, including a processing module and a communication interface, and the processing module can execute the information transmission method provided by any one of the second aspect.

BRIEF DESCRIPTION OF DRAWINGS

In order to describe technical solutions in embodiments of the present disclosure or the prior art more clearly, the following will briefly introduce drawings that need to be used in descriptions of the embodiments or the prior art. Obviously, the drawings described below are some embodiments of the present disclosure, and for those of ordinary skill in the art, other drawings can be obtained based on these drawings without creative labor.

FIG. 1 is a schematic diagram of a communication system applied in an embodiment of the present disclosure;

FIG. 2 is a schematic flowchart of a first embodiment of an information transmission method provided by an embodiment of the present disclosure;

DESCRIPTION OF EMBODIMENTS

Figure 3:
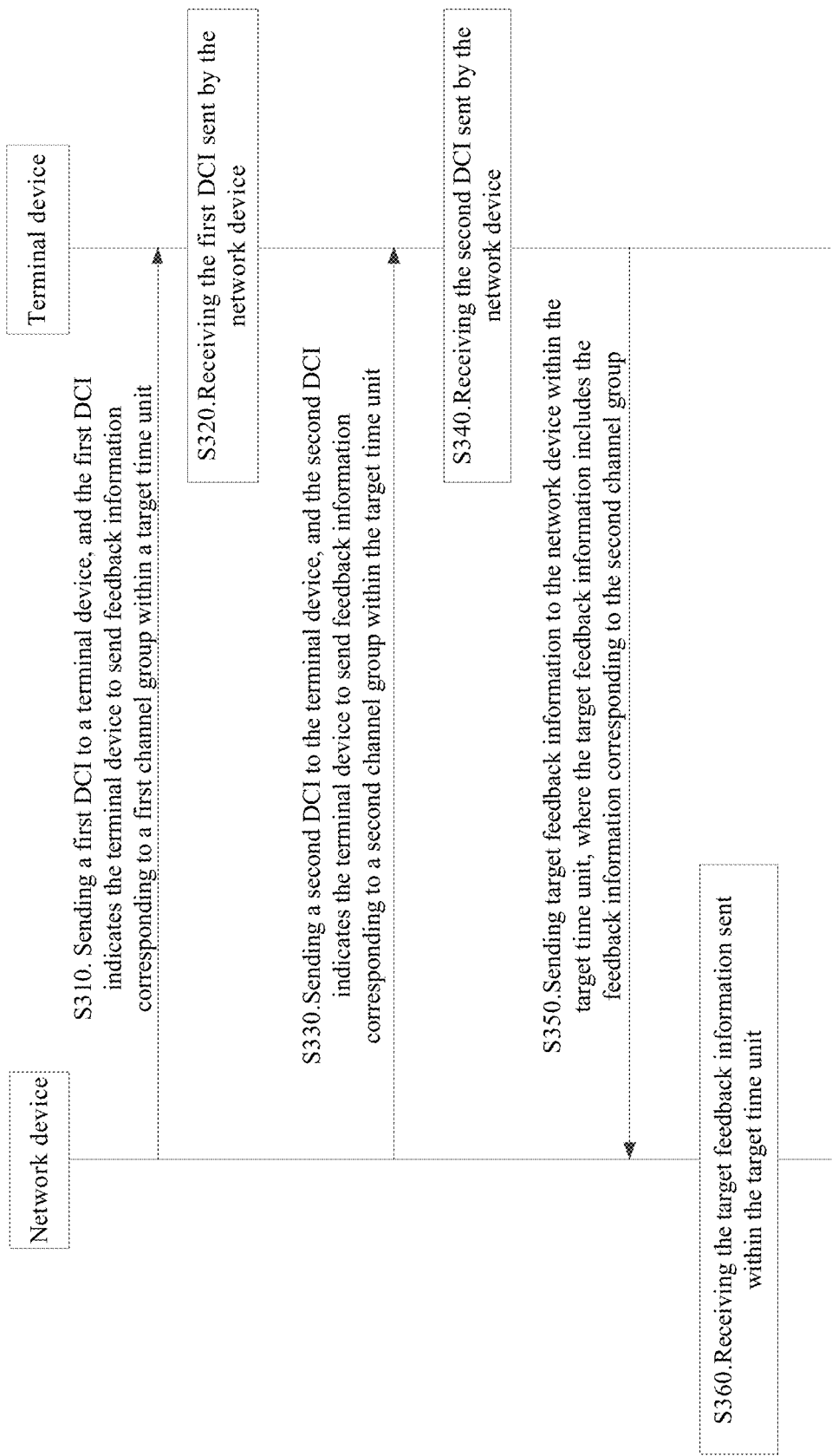
FIG. 3 is a schematic flowchart of a second embodiment of an information transmission method provided by an embodiment of the present disclosure.

In order to make purposes, technical solutions and advantages of embodiments of the present disclosure clearer, the technical solutions in the embodiments of the present disclosure will be described clearly and completely in combination with the drawings of the embodiments of the present disclosure. Obviously, the described embodiments are parts of the embodiments of the present disclosure, but not all of the embodiments. Based on the embodiments of the present disclosure, all other embodiments obtained by those of ordinary skill in the art without creative work shall fall within a protection scope of the present disclosure.

The terms "first", "second" and so forth in the description, claims, and the foregoing drawings of the embodiments of the present disclosure are used to distinguish similar objects, and are not necessarily used to describe a specific sequence or sequence. It should be understood that data used in this way can be interchanged under appropriate circumstances, so that the embodiments of the present disclosure described herein can be implemented in a sequence other than those, for example, as illustrated or described herein. In addition, the terms "including" and "having" and any variations of them are intended to cover non-exclusive inclusions. For example, a process, method, system, product or device that includes a series of steps or units is not necessarily limited to the steps or units clearly listed, but includes other steps or units that are not clearly listed or other steps or units which are inherent to these processes, methods, products, or devices.

It should be understood that the terms "system" and "network" herein are often used interchangeably herein. The term "and/or" herein is only an association relationship describing associated objects, which means that there can be three kinds of relationships, for example, A and/or B, which can mean three cases that: A alone exists, A and B exist at the same time, B alone exists. In addition, the character "/" herein generally indicates that the associated objects before and after are in an "or" relationship.

The technical solutions in the embodiments of the present disclosure will be described below in combination with the drawings of the embodiments of the present disclosure.

Obviously, the described embodiments are parts of the embodiments of the present disclosure, not all of the embodiments. Based on the embodiments of the present disclosure, all other embodiments obtained by those of ordinary skill in the art without creative work shall fall within a protection scope of the present disclosure.

At present, in the New Radio (NR) standard Rel-15, a terminal device determines time for sending feedback information corresponding to the DCI according to a timing indicator information field in the DCI. For example, the terminal device determines the time for sending the feedback information corresponding to the DCI according to the PDSCH-to-HARQ feedback timing indicator information field in the DCI. Specifically, if the end position of the PDSCH scheduled by the DCI is in slot n, then corresponding ACK/NACK feedback information is transmitted in slot n+k, where k is indicated by the PDSCH-to-HARQ feedback timing indicator information field.

In the NR standard Rel-16, for the NR-based Access to Unlicensed Spectrum (NR-U), a feedback method based on an Acknowledgement/Negative Acknowledge of two channel groups is supported. If a base station sends DCI to a terminal device, the DCI indicates the terminal device to feed back ACK/NACK information corresponding to a certain channel group in a target slot, then the terminal device will feed back feedback information corresponding to a PDSCH or PDCCH belonging to the channel group to the base station together. The 3rd generation partnership project (3GPP) determined to introduce 1 bit information in the DCI format, such as DCI format 1_1, to indicate to trigger the channel group; when a value of the bit is "0", it means to trigger a transmission of the feedback information of the channel group in the PDSCH scheduled by the current DCI, and when the value of the bit is "1", it means to trigger the transmission of the feedback information of two channel group.

However, in the above solution, when the terminal device receives two DCIs for the same time unit, such as a slot, if the two DCI signaling indicate to feed back the feedback information of different channel groups, it will cause inconsistent understandings of transmission channels and the feedback information between the base station and the terminal device, and cause the base station to fail to receive the feedback information of the terminal device correctly, which in turn cause a transmission performance of uplink control information to decrease, and affects a communication efficiency of a communication system.

In response to the foregoing problems, the embodiments of the present disclosure provide an information transmission method. The terminal device receives a first DCI and a second DCI sent by the network device, where the first DCI indicates the terminal device to send feedback information corresponding to a first channel group within a target time unit, and the second DCI indicates the terminal device to send feedback information corresponding to a second channel group within the target time unit, then the terminal device sends the feedback information corresponding to the second channel group to the network device within the target time unit. Based on the technical solutions of the embodiments of the present disclosure, when receiving the first DCI and the second DCI sent by the network device, the terminal device sends the feedback information corresponding to the channel group indicated by the second DCI to the network device, or sends the feedback information corresponding to the channel groups indicated by the first DCI and the second DCI to the network device, even if the two DCIs indicate to feed back the feedback information of different channel groups for the same time unit, it can ensure consistent understandings for transmission channels and the feedback information between the network device and the terminal device, so as to ensure that the network device can receive the feedback information of the terminal device correctly, thereby improving a transmission performance of uplink control information and improving a communication efficiency of a communication system.

The technical solutions of the embodiments of the present disclosure can be applied to various communication systems, such as: global system of mobile communication (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD) system, advanced long term evolution (LTE-A) system, new radio (NR) system, NR system evolution system, LTE-based access to unlicensed spectrum (LTE-U) system, NR-based access to unlicensed spectrum (NR-U) system, universal mobile telecommunication system (UMTS), worldwide interoperability for microwave access (WiMAX) communication systems, wireless local area networks (WLAN), wireless fidelity (WiFi), next-generation communication systems or other communication systems, etc.

Generally speaking, traditional communication systems support a limited number of connections and are easy to implement. However, with the development of communication technology, mobile communication systems will not only support traditional communications, but will also support, for example, device to device (D2D) communication, machine to machine (M2M) communication, machine type communication (MTC), vehicle to vehicle (V2V) communication and so forth. The embodiments of the present disclosure can also be applied to these communications system.

FIG. 1 is a schematic diagram of a communication system applied in an embodiment of the present disclosure. As shown in FIG. 1, the communication system 100 may include a network device 110, and the network device 110 may be devices communicate with a terminal device 120 (or called a communication terminal or terminal). The network device 110 may provide communication coverage for a specific geographic area, and may communicate with terminal devices located within the coverage area. In an implementation, the network device 110 may be a base transceiver station (BTS) in a GSM system or a CDMA system, a NodeB (NB) in a WCDMA system, an evolutional Node B (eNB or eNodeB) in an LTE system or a wireless controller in a cloud radio access network (CRAN), or the network equipment can be a mobile switching center, a relay station, an access point, a vehicle-mounted device, a wearable device, a hub, a switch, a bridge, a router, a network equipment in the 5G network or in a public land mobile network (PLMN) of future evolution and so forth.

The communication system 100 further includes at least one terminal device 120 located within a coverage of the network device 110. As the "terminal device" used herein, includes, but is not limited to, connection via wired lines, such as connection via public switched telephone networks (PSTN), digital subscriber line (DSL), digital cables and direct cable; and/or via another data connection/network; and/or via wireless interfaces, such as cellular networks, wireless local area networks (WLAN), digital TV networks (e.g., DVB-H networks), satellite networks and AM-FM broadcast transmitter; and/or another apparatus of other terminal device that is set to receive/send communication signals; and/or internet of things (IoT) devices. A terminal device set to communicate through a wireless interface may be referred to as a "wireless communication terminal", a "wireless terminal" or a "mobile terminal". Examples of mobile terminals include, but are not limited to, satellite or cellular phones; personal communications system (PCS) terminals that can combine cellular radio phones with data processing, fax and data communication capabilities; which can include radio phones, pagers, Internet/intranet access, Web browser, memo pad, calendar, and/or PAD of a global positioning system (GPS) receiver; as well as conventional laptop and/or palmtop receivers or others electronic devices including radio telephone transceivers. The terminal device can refer to access terminals, user equipment (UE), user units, user stations, mobile stations, mobile platforms, remote stations, remote terminals, mobile equipment, user terminals, terminals, wireless communication equipment, user agents, or user apparatus. The access terminal can be cellular phones, cordless phones, session initiation protocol (SIP) phones, wireless local loop (WLL) stations, personal digital assistants (PDA), handheld devices with wireless communication function, computing devices or other processing devices connected to wireless modems, vehicle-mounted devices, wearable devices, terminal devices in 5G networks, or terminal devices in the future evolution of PLMN and so forth.

In an implementation, a device to device (D2D) communication may be performed between the terminal devices 120, that is, the technical solution provided in the present disclosure may also be applied to a communication between two terminal devices.

In an implementation, a 5G system or 5G network may also be referred to as a new radio (NR) system or NR network.

FIG. 1 exemplarily shows one network device and two terminal devices. In an implementation, the communication system 100 may include multiple network devices and other numbers of terminal devices may be located within the coverage of each network device, which are not limited in the embodiment of the present disclosure.

In FIG. 1, the network device may be the access device, for example, it may be the access device in an NR-U system, such as a next generation Node B (gNB) of the new radio access technology (NR) in 5G, a small station or a micro station, it may also be a relay station, a transmission and reception point (TRP), a road side unit (RSU) and so forth.

The terminal device may also be referred to as the mobile terminal, the user equipment (UE), the access terminal, the user unit, the user station, the mobile station, the mobile platform, the user terminal, the terminal, the wireless communication equipment, the user agent or the user apparatus. Specifically, it may be a smart phone, the cellular phone, the cordless phone, the personal digital assistant (PDA) device, the handheld device with wireless communication function or other processing devices connected to the wireless modem, the vehicle-mounted device, the wearable device and so forth. In the embodiment of the present disclosure, the terminal device has an interface for communicating with the network device (for example, the cellular network).

In an implementation, the communication system 100 may also include other network entities such as a network controller and a mobility management entity, which are not limited in the embodiment of the present disclosure.

The information transmission method provided in the exemplary embodiment of the present disclosure will be described in detail below with reference to the accompanying drawings.

FIG. 2 is a schematic flowchart of a first embodiment of an information transmission method provided by an embodiments of the application. As shown in FIG. 2, the information transmission method can be applied between a network device and a terminal device, and specifically includes the following steps:

S210: receiving a first downlink control information DCI, where the first DCI indicates the terminal device to send feedback information corresponding to a first channel group within a target time unit.

In an exemplary embodiment, the terminal device receives the first DCI sent by the network device, and the first DCI indicates the terminal device to send feedback information, such as ACK/NACK feedback information, corresponding to the first channel group to the network device within the target time unit. For example, the first DCI contains one bit information, which is used to indicate the feedback information of which channel group the terminal device sends within the target time unit. For example, if a value of the bit information is "0", it means that the terminal device sends the feedback information of the channel group to which a PDSCH scheduled by the current DCI belongs within the target time unit, or means the feedback information of the channel group to which a PDCCH carrying the DCI belongs, and the value of the bit information is "1" means that the feedback information of the two channel groups is triggered to be transmitted.

It should be noted that the target time unit may be a slot, or other appropriate time-domain transmission units such as subframes, symbols and so forth, which are not specifically limited in the present disclosure.

Further, the number of the first channel group is one or more. For example, the first channel group may be channel group 0 or channel group 1, or may be channel group 0 and channel group 1.

S220: receiving a second DCI, where the second DCI indicates the terminal device to send feedback information corresponding to a second channel group within the target time unit.

In an exemplary embodiment, the terminal device receives the second DCI sent by the network device, and the second DCI indicates the terminal device to send feedback information corresponding to the second channel group within the target time unit, the second DCI may be a DCI received after receiving the first DCI.

It should be noted that although in the exemplary embodiment, the receiving time of the second DCI is after the receiving time of the first DCI, but which is not limited in the embodiment of the present disclosure, and the receiving time of the second DCI may also be before the receiving time of the first DCI, which are not specifically limited in the present disclosure.

Further, the number of the second channel group is one or more. For example, the second channel group may be channel group 0 or channel group 1, or channel group 0 and channel group 1.

S230: sending target feedback information within the target time unit, where the target feedback information includes the feedback information corresponding to the second channel group.

In an exemplary embodiment, the terminal device sends the target feedback information to the network device through a physical uplink control channel (PUCCH) within the target time unit, where the target feedback information includes the feedback information corresponding to the second channel group. For example, if the second channel group is channel group 0 or channel group 1, the target feedback information includes the feedback information corresponding to the channel group 0 or channel group 1; if the second channel is channel group 0 and channel group 1, the target feedback information includes the feedback information corresponding to the channel group 0 and channel group 1.

It should be noted that although the terminal device sends the target feedback information through the PUCCH is taking as an example, it should be understood by those skilled in the art that in the example embodiments of the present disclosure, the physical uplink shared channel (PUSCH) may also be used to send the target feedback information, which are not specifically limited in the present disclosure.

According to the information transmission method in the exemplary embodiment of FIG. 2, when the terminal device receives the first DCI and the second DCI sent by the network device, it sends the feedback information corresponding to the channel group indicated by the second DCI to the network device, even if the two DCI indicates to feed back the feedback information of different channel groups for the same time unit, and the consistent understandings for transmission channels and the feedback information between the network device and the terminal device can still be ensured, so as to ensure that the network device can receive the feedback information of the terminal device correctly, and then can improve a transmission performance of uplink control information and improve a communication efficiency of a communication system.

Further, in the exemplary embodiment of FIG. 2, when the terminal device sends the target feedback information to the network device within the target time unit, a transmission resource (for example, PUCCH resource) for sending the target feedback information need to be determined. In the exemplary embodiment, the transmission resource for sending the target feedback information can be determined in one of the following two manners.

Manner 1

The terminal device determines a target transmission resource based on indication information in the second DCI, where the target transmission resource is used to send the target feedback information, and the target transmission resource is located within the target time unit in a time domain. For example, the terminal device determines a target PUCCH based on a PUCCH resource indicator information field in the second DCI, where the target PUCCH is used to send the target feedback information to the network device within the target time unit. After the target transmission resource is determined, the target feedback information is sent to the network through the target transmission resource within the target time unit.

Manner 2

The terminal device determines the target transmission resource based on a number of the target feedback information bits and the indication information in the second DCI, where the target transmission resource is used to send the target feedback information, and the target transmission resource is located within the target time unit in the time domain. For example, after determining the target time unit (for example, a slot) for transmitting the feedback information, the terminal device determines a total number of the feedback information bits transmitted within the target time unit, and determines a PUCCH resource set from a pre-configured PUCCH resource sets according to the total number of the feedback information bits.

Specifically, the network device configures a maximum of 4 PUCCH resource sets (or called a PUCCH resource group) through high-level signaling, and each PUCCH resource set includes a maximum of 16 PUCCH resources. A range of the number of uplink control information (UCI) bits carried by each of the PUCCH resource set is different, specifically as follows:

(1) A first PUCCH resource group, the number of the UCI bits that carried is $O_{UCI} \leq 2$;

(2) A second PUCCH resource group, the number of the UCI bits that carried is $2 < O_{UCI} \leq N_2$, which the $N_2$ is configured by the high-level signaling maxPayloadMinus1. If the maxPayloadMinus1 is not received, the $N_2$ is equal to 1706;

(3) A third PUCCH resource group, the number of the UCI bits that carried is $N_2 < O_{UCI} \leq N_3$, in which the $N_3$ is configured by the high-level signaling maxPayloadMinus1. If the maxPayloadMinus1 is not received, the $N_3$ is equal to 1706;

(4) A fourth PUCCH resource group, the number of the UCI bits that carried is $N_3 < O_{UCI} \leq 1706$.

The terminal device determines a PUCCH resource set according to the number of the feedback information bits in UCI information to be transmitted. Then, a PUCCH resource actually used is obtained from the PUCCH resource set according to an indication of PUCCH resource indicator (resource indicator) information field in the DCI.

Further, in the exemplary embodiment of FIG. 2, the second channel group indicated by the second DCI includes the first channel group indicated by the first DCI, and the target feedback information is the feedback information corresponding to the second channel group. For example, if the first channel group is channel group 0, the second channel group is channel group 0 and 1, or the second channel group is channel group 0. If the first channel group is channel group 0, and the second channel group is channel group 0 or 1, the target feedback information is the feedback information corresponding to channel group 0 or 1. If the first channel group is channel group 0, and the second channel group is channel group 0, the target feedback information is the feedback information corresponding to channel group 0.

In addition, in the exemplary embodiment of FIG. 2, if the second channel group indicated by the second DCI does not include the first channel group indicated by the first DCI, the target feedback information can be sent to the network device through one of the following manners.

Manner 1

The terminal device determines a first transmission resource according to the indication information in the first DCI, and determines a second transmission resource according to the indication information in the second DCI; if the first transmission resource and the second transmission resource do not overlap (for example, do not overlap in a time domain and/or a frequency domain), the terminal device sends the feedback information corresponding to the first channel group through the first transmission resource within the target time unit, and sends the feedback information corresponding to the second channel group through the second transmission resource within the target time unit.

Manner 2

The terminal device determines the first transmission resource according to the number of the feedback information bits corresponding to the first channel group and the indication information in the first DCI; and determines the second transmission resource according to the number of the feedback information bits corresponding to the second channel group and the indication information in the second DCI; if the first transmission resource and the second transmission resource do not overlap (for example, do not overlap in the time domain and/or the frequency domain), the terminal device sends the feedback information corresponding to the first channel group through the first transmission resource within the target time unit; and sends the feedback information corresponding to the second channel group through the second transmission resource within the target time unit.

Manner 3

The terminal device determines the first transmission resource according to the indication information in the first DCI, and determines the second transmission resource according to the indication information in the second DCI; if the first transmission resource overlaps the second transmission resource (for example, overlaps in the time domain), the terminal device sends the target feedback information through the second transmission resource within the target time unit.

Manner 4

The terminal device determines the first transmission resource according to the number of the feedback information bits corresponding to the first channel group and the indication information in the first DCI; and determines the second transmission resource according to the number of the feedback information bits corresponding to the second channel group and the indication information in the second DCI. If the first transmission resource overlaps the second transmission resource (for example, overlaps in the time domain), the terminal device determines a third transmission resource according to a total number of the target feedback information bits and the indication information in the second DCI, sends the target feedback information to the network device through the third transmission resource within the target time unit, the target feedback information includes the feedback information corresponding to the first channel group and the feedback information corresponding to the second channel group.

It should be noted that the first transmission resource and the second transmission resource may partially or completely overlap, which is not specifically limited in the present disclosure.

FIG. 3 is a schematic flowchart of a second embodiment of an information transmission method provided by an embodiment of the present disclosure.

Referring to FIG. 3, in step S310, a network device sends a first DCI to a terminal device, and the first DCI indicates the terminal device to send feedback information corresponding to a first channel group within a target time unit.

In the exemplary embodiment, the target time unit may be a slot, or may be other appropriate time domain transmission units such as subframes, symbols and so forth, which are not specifically limited in the present disclosure.

Further, the number of the first channel group is one or more. For example, the first channel group may be channel group 0 or channel group 1, or may be channel group 0 and channel group 1.

In step S320, the terminal device receives the first DCI sent by the network device.

In step S330, the network device sends a second DCI to the terminal device, and the second DCI indicates the terminal device to send feedback information corresponding to a second channel group within the target time unit.

In an exemplary embodiment, the second DCI may be a DCI received after receiving the first DCI, and a format of the second DCI is one of DCI format 1_1, DCI format 1_2, DCI format 0_1, and DCI format 0_2.

It should be noted that although in the exemplary embodiment, receiving time of the second DCI is after the receiving time of the first DCI, but which is not limited in the embodiment of the present disclosure, and the receiving time of the second DCI may also be before the receiving time of the first DCI, which are not specifically limited in the present disclosure.

Further, the number of the second channel group is one or more. For example, the second channel group may be channel group 0 or channel group 1, or channel group 0 and channel group 1.

In step S340, the terminal device receives the second DCI sent by the network device.

In step S350, the terminal device sends target feedback information to the network device within the target time unit, where the target feedback information includes the feedback information corresponding to the second channel group.

In an exemplary embodiment, the terminal device sends the target feedback information to the network device through the PUCCH within the target time unit, and the target feedback information includes the feedback information corresponding to the second channel group. For example, if the second channel group is channel group 0 or channel group 1, the target feedback information includes the feedback information corresponding to the channel group 0 or channel group 1; if the second channel is channel group 0 and channel group 1, the target feedback information includes the feedback information corresponding to the channel group 0 and channel group 1.

In step S360, the network device receives the target feedback information sent by the terminal device within the target time unit.

On the basis of the foregoing embodiments, implementations in three cases in a specific application process of the information transmission method in the embodiments of the present disclosure will be described in detail below with reference to the drawings.

Case 1: The terminal device receives the first DCI, where the first DCI indicates the terminal device to send the feedback information of the first channel group within the target time unit; and the terminal device receives the second DCI, where the second DCI indicates the terminal device to send the feedback information of the second channel group within the target time unit.

Further, transmission time of the second DCI is after the transmission time of the first DCI, and the second channel group includes the first channel group. The terminal device sends the feedback information corresponding to the second channel group within the target time unit. The terminal device uses physical resources, such as PUCCH resources or PUSCH resources, indicated by the second DCI to transmit the feedback information corresponding to the second channel group. The second DCI is not the DCI format 1_0 or the DCI format 0_0; or the second DCI is one of the DCI format 1_1, DCI format 0_1, DCI format 1_2 and DCI format 0_2.

In this case, the DCI performs an increment to trigger channel groups, that is, the channel group that be triggered to feed back by the DCI transmitted later is the same as the channel group that be triggered to feed back by the DCI transmitted earlier, or the channel group that be triggered to feed back by the DCI transmitted later adds a new feedback channel group on the basis of the channel group that be triggered to feed back by the DCI transmitted earlier. In other words, the terminal device does not expect that the channel group that be triggered to feed back by the DCI transmitted later does not include the channel group that be triggered to feed back by the DCI transmitted earlier. For example, if the first channel group is channel group 0, the second channel group is channel groups 0 and 1, or the second channel group is channel group 0. The information transmission method in the exemplary embodiment of the Case 1 will be described in detail below with reference to FIG. 4.

Figure 4:
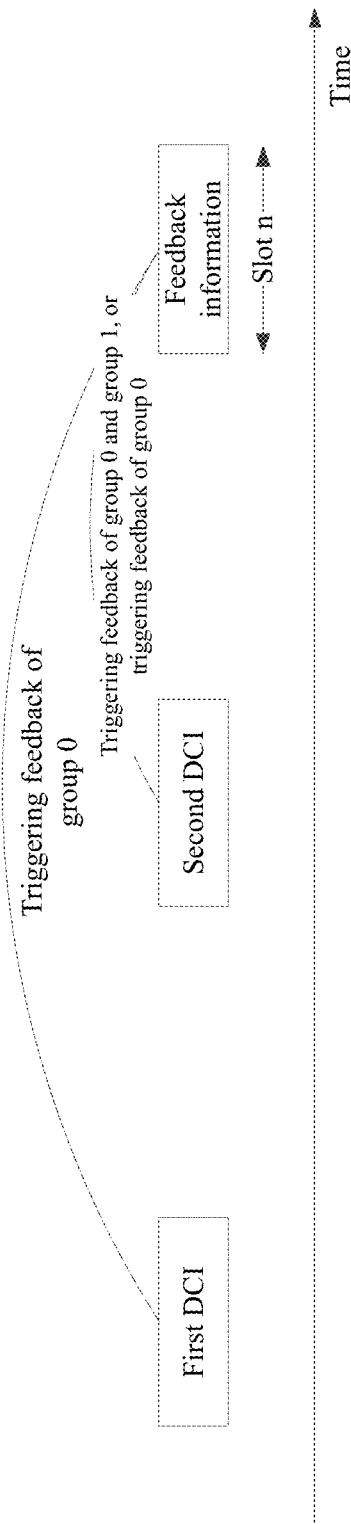
FIG. 4 is a schematic diagram of a third embodiment of an information transmission method provided by an embodiment of the present disclosure.

As shown in FIG. 4, the first DCI is transmitted earlier, which triggers the terminal device to send the feedback information, that is, ACK/NACK information corresponding to channel group 0 in the slot n. The second DCI is transmitted after the first DCI, and the second DCI triggers the terminal device to send one of the following two types of the feedback information in the slot n:

(1) ACK/NACK Information of Channel Group 0.

If the second DCI indicates the terminal device to send the ACK/NACK information of the channel group 0 in the slot n, the terminal device uses the PUCCH resource indicated by the second DCI to transmit the ACK/NACK information corresponding to the channel group 0; or, the terminal device determines the number of ACK/NACK information bits corresponding to the channel group 0, and the terminal device determines the PUCCH resource according to the number of bits and an indication of the PUCCH resource indicator information field in the second DCI.

(2) ACK/NACK Information of Channel Group 0 and Channel Group 1.

If the second DCI indicates the terminal device to send the ACK/NACK information of the channel group 0 and channel group 1 in the slot n, the terminal uses the PUCCH resource indicated by the second DCI to transmit the ACK/NACK information corresponding to the channel group 0 and channel group 1; or, the terminal device determines the number of ACK/NACK information bits corresponding to the channel group 0 and channel group 1, and the terminal device determines the PUCCH resource according to the number of bits and the indication of the PUCCH resource indicator information field in the second DCI.

Case 2: the terminal device receives the first DCI, where the first DCI indicates the terminal device to send the feedback information of the first channel group within the target time unit; and the terminal device receives the second DCI, where the second DCI indicates the terminal device to send the feedback information of the second channel group within the target time unit.

Further, the transmission time of the second DCI is after the transmission time of the first DCI, and the second channel group does not include the first channel group. The terminal device determines the PUCCH resource within the target time unit according to the second DCI, and the terminal device uses the determined PUCCH resource to transmit the ACK/NACK information corresponding to the first channel group and the second channel group; or, the terminal device uses the determined PUCCH resource to transmit the ACK/NACK information corresponding to the second channel group. The ACK/NACK information corresponding to the first channel group will not be transmitted within the target time unit. In which, the format of the second DCI is DCI format 1_0 or DCI format 0_0. The information transmission method in the exemplary embodiment of the Case 2 will be described in detail below with reference to FIG. 5.

Figure 5:
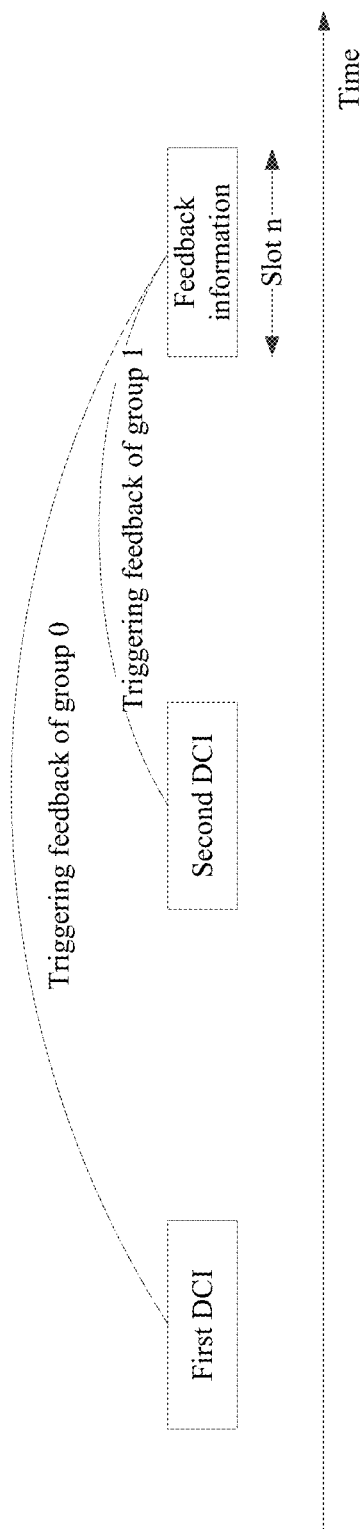
FIG. 5 is a schematic diagram of a fourth embodiment of an information transmission method provided by an embodiment of the present disclosure.

Referring to FIG. 5, the first DCI is transmitted earlier, which triggers the terminal device to send the ACK/NACK information corresponding to the channel group 0 in the slot n. The second DCI is transmitted after the first DCI, and the second DCI triggers the terminal device to send the ACK/NACK information corresponding to the channel group 1 in the slot n.

(1) The terminal device determines a PUCCH resource according to the indication of the PUCCH resource indicator information field in the second DCI, and transmits the ACK/NACK information corresponding to the channel group 0 and channel group 1 through the PUCCH; or, the terminal device determines a number of the ACK/NACK information bits corresponding to the channel group 0 and channel group 1, and the terminal device determines a PUCCH resource according to the number of bits and the indication of the PUCCH resource indicator information field in the second DCI.

(2) The terminal device determines a PUCCH resource according to the indication of the PUCCH resource indicator information field in the second DCI, and transmits the ACK/NACK information corresponding to channel group 1 through the PUCCH resource; or the terminal device determines the number of the ACK/NACK information bits corresponding to the channel 1 group, and the terminal device determines a PUCCH resource according to the number of bits and the indication of the PUCCH resource indicator information field in the second DCI.

Case 3: the terminal device receives the first DCI, the first DCI indicates the terminal device to send the feedback information of the first channel group within the target time unit; the terminal device receives the second DCI, and the second DCI indicates the terminal device to send the feedback information of the second channel group within the target time unit, and the second channel group is different from the first channel group.

Further, the transmission time of the second DCI is after the transmission time of the first DCI, and the second channel group does not include the first channel group. The terminal device determines the first PUCCH resource within the target time unit according to the first DCI. The terminal device determines the second PUCCH resource within the target time unit according to the second DCI. In Case 3, the following two embodiments are included:

Embodiment (1): If the first PUCCH resource and the second PUCCH resource do not overlap, the terminal device uses the first PUCCH resource to transmit the ACK/NACK information corresponding to the first channel group, and uses the second PUCCH resource to transmit the ACK/NACK information corresponding to the second channel group;

Embodiment (2): If the first PUCCH resource and the second PUCCH resource overlap, for example, in the time domain, the terminal device uses the second PUCCH resource to transmit the ACK/NACK information corresponding to the second channel group; or, the terminal device determines a third PUCCH resource according to the second DCI, and uses the third PUCCH resource to transmit the ACK/NACK information corresponding to the first channel group and the second channel group.

The information transmission method in the exemplary Embodiment (1) of Case 2 will be described in detail below in combination with FIG. 6 and FIG. 7.

Figure 6:
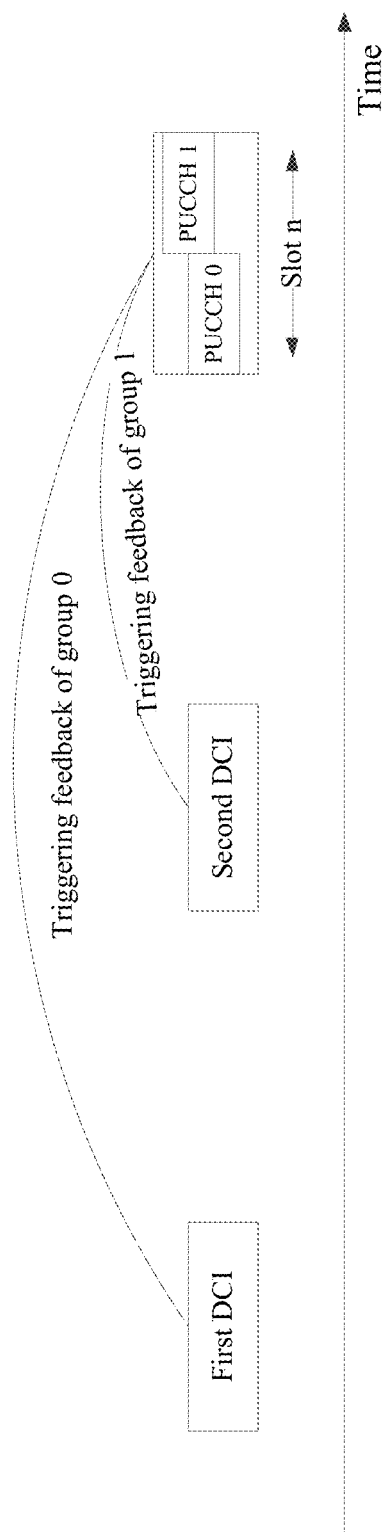
FIG. 6 is a schematic diagram of a fifth embodiment of an information transmission method provided by an embodiment of the present disclosure.
Figure 7:
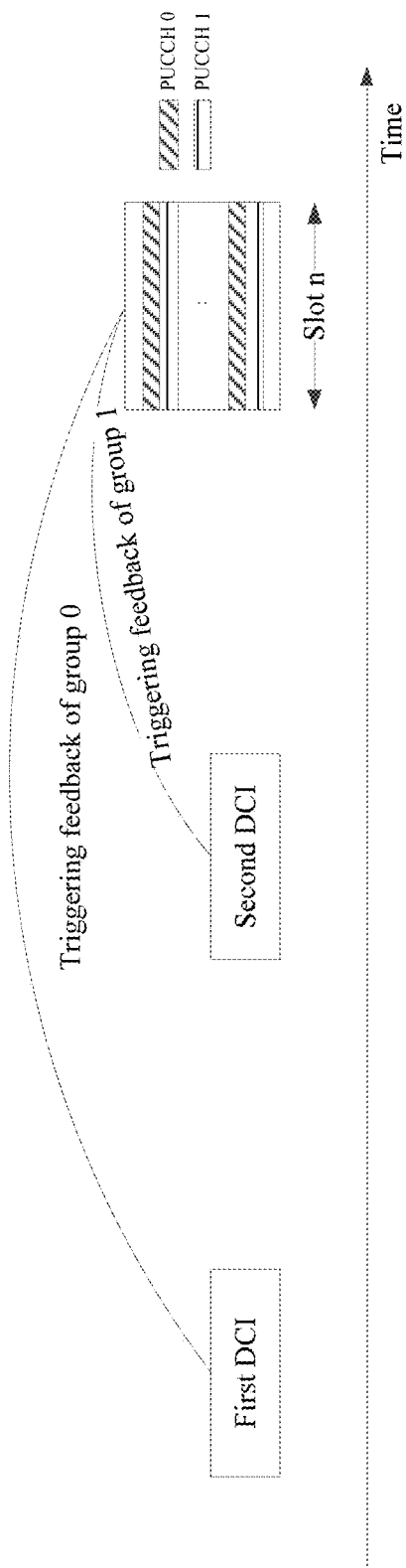
FIG. 7 is a schematic diagram of a sixth embodiment of an information transmission method provided by an embodiment of the present disclosure.

As shown in FIG. 6 and FIG. 7, the first DCI is transmitted earlier, which triggers the terminal device to send the ACK/NACK information of channel group 0 in the slot n. The terminal device determines a PUCCH 0 in the slot n according to an indication of the PUCCH resource indicator information field in the first DCI, or the terminal device determines the PUCCH 0 in the slot n according to the number of ACK/NACK bits corresponding to the channel group 0 and the indication of the PUCCH resource indicator information field in the first DCI.

The second DCI is transmitted after the first DCI, and the second DCI triggers the terminal device to send the ACK/NACK information of the channel group 1 in the slot n. The terminal device determines a PUCCH 1 in the slot n according to the indication of the PUCCH resource indicator information field in the second DCI, or the terminal device determines the PUCCH 1 in the slot n according to the number of ACK/NACK bits corresponding to the channel group 1 and the indication of the PUCCH resource indicator information field in the second DCI.

In FIG. 6, the PUCCH 0 and the PUCCH 1 occupy different time domain symbols for transmission, that is, the time domain does not overlap. The terminal device uses the PUCCH 0 to transmit the ACK/NACK information corresponding to the channel group 0, and uses the PUCCH 1 to transmit the ACK/NACK information corresponding to the channel group 1. In FIG. 7, the PUCCH 0 and the PUCCH 1 occupy different frequency domain resources for transmission, that is, the frequency domains do not overlap. The terminal device uses the PUCCH 0 to transmit the ACK/NACK information corresponding to the channel group 0, and uses the PUCCH 1 to transmit the ACK/NACK information corresponding to the channel group 1.

The information transmission method in the exemplary Embodiment (2) of Case 2 will be described in detail below in combination with FIG. 8.

Figure 8:
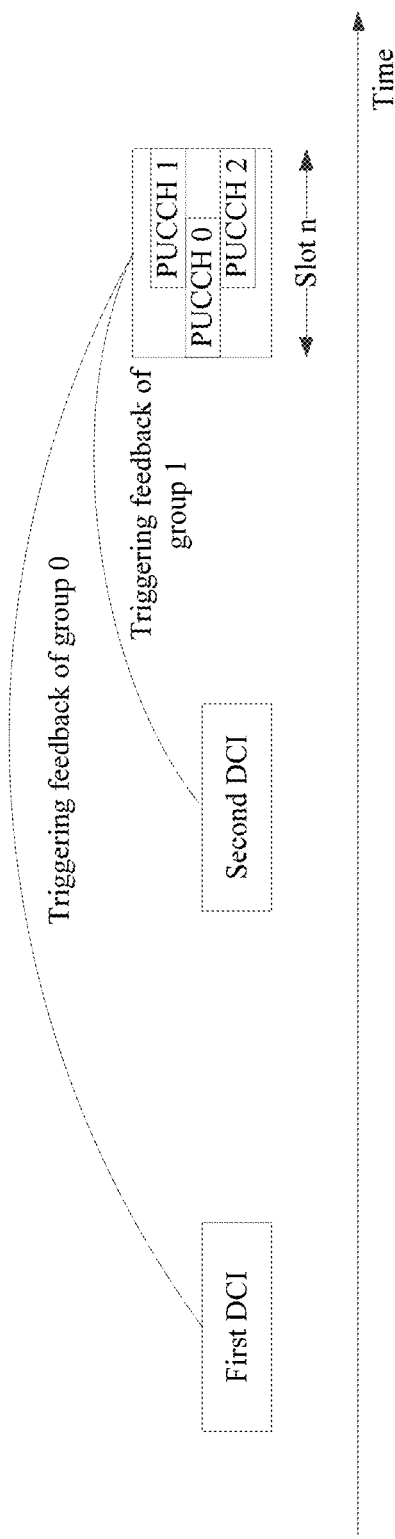
FIG. 8 is a schematic diagram of a seventh embodiment of an information transmission method provided by an embodiment of the present disclosure.

As shown in FIG. 8, the first DCI is transmitted earlier, which triggers the terminal device to send the ACK/NACK information corresponding to the channel group 0 in slot n. The terminal device determines to obtain PUCCH 0 in the slot n according to the indication of the PUCCH resource indicator information field in the first DCI, or the terminal device determines to obtain the PUCCH 0 in the slot n according to a number of ACK/NACK bits corresponding to the channel group 0 and the indication of the PUCCH resource indicator information field in the first DCI.

The second DCI is transmitted after the first DCI, and the second DCI triggers the terminal device to send the ACK/NACK information of the channel group 1 in the slot n. The terminal device determines to obtain PUCCH 1 in the slot n according to the indication of the PUCCH resource indicator information field in the second DCI, or the terminal device determines to obtain the PUCCH 1 in the slot n according to a number of the ACK/NACK bits corresponding to the channel group 1 and the indication of the PUCCH resource indicator information field in the second DCI.

In this example embodiment, the time domain symbols occupied by the PUCCH 0 and the PUCCH 1 partially overlap, and the terminal device sends the feedback information in one of the following two manners:

Manner (1): The terminal device uses the PUCCH 1 to transmit the ACK/NACK information corresponding to the channel group 1. That is, the terminal device transmits the feedback information triggered by the later DCI; or, Manner (2): The terminal device determines the PUCCH 2 resource according to the total number of the feedback information bits corresponding to the channel group 0 and the channel group 1 and the indication of the PUCCH resource indicator information field in the second DCI, and uses the determined PUCCH 2 to transmit the feedback information corresponding to the channel group 0 and the channel group 1.

Based on the technical solutions provided by the above several examples, when the terminal device receives the first DCI and the second DCI sent by the network device, it sends the feedback information corresponding to the channel group indicated by the second DCI to the network device, or sends the feedback information corresponding to the channel groups indicated by the first DCI and the second DCI to the network device, even if two DCIs indicate to feed back the feedback information of different channel groups for the same time unit, the consistent understandings of the transmission channels and the feedback information between the network device and the terminal device can still be ensured, which can ensure that the network device can receive the feedback information of the terminal device correctly, thereby improving the transmission performance of the uplink control information and improving the communication efficiency of the communication system.

Figure 9:
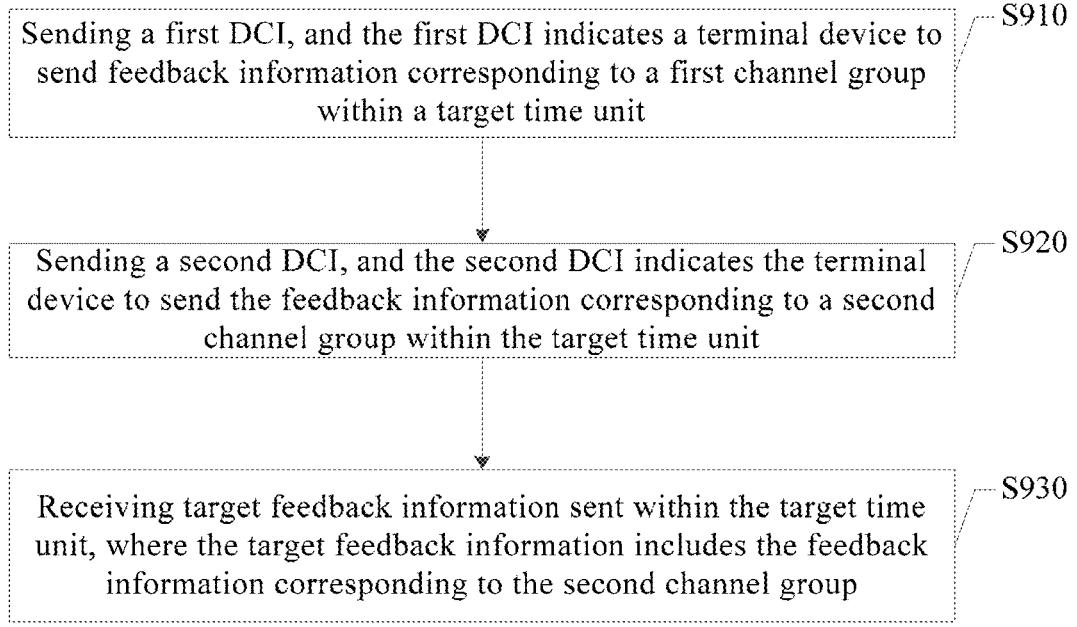
FIG. 9 is a schematic flowchart of an eighth embodiment of an information transmission method according to an embodiment of the present disclosure.

FIG. 9 is a schematic flowchart of an eighth embodiment of an information transmission method provided by an embodiment of the present disclosure. The information transmission method is applied to a network terminal, and the information transmission method includes steps S910 to S930. The information transmission method will be described in detail below with reference to the drawings.

In step S910, sending a first downlink control information DCI, and the first DCI indicates the terminal device to send feedback information corresponding to a first channel group within a target time unit;

in step S920, sending a second DCI, and the second DCI indicates the terminal device to send feedback information corresponding to a second channel group within the target time unit, in step S930, receiving target feedback information sent within the target time unit, where the target feedback information includes the feedback information corresponding to the second channel group.

Since the information transmission method in the exemplary embodiment of FIG. 9 corresponds to each step of the information transmission method in the exemplary embodiment of FIG. 2, details will not be repeated herein.

In some example embodiments of the present disclosure, based on the foregoing solution, a transmission time of the second DCI is after the transmission time of the first DCI.

In some example embodiments of the present disclosure, based on the foregoing solution, the second channel group includes the first channel group.

In some example embodiments of the present disclosure, based on the foregoing solution, the second DCI is one of DCI format 1_1, DCI format 1_2, DCI format 0_1, and DCI format 0_2.

In some example embodiments of the present disclosure, based on the foregoing solution, the second channel group does not include the first channel group, and the target feedback information further includes the feedback information corresponding to the first channel group.

In some example embodiments of the present disclosure, based on the foregoing solution, the receiving the target feedback information sent within the target time unit includes: receiving the target feedback information sent through a target transmission resource, where the target transmission resource is determined according to the second DCI, and the target transmission resource is located within the target time unit in a time domain.

In some example embodiments of the present disclosure, based on the foregoing solution, the receiving the target feedback information sent within the target time unit includes: receiving the target feedback information sent through the target transmission resource, where the target transmission resource is determined according to the number of the target feedback information bits and the second DCI, the target transmission resource is located within the target time unit in the time domain.

In some example embodiments of the present disclosure, based on the foregoing solution, the second channel group does not include the first channel group, and the receiving the target feedback information sent within the target time unit includes: receiving the feedback information corresponding to the first channel group sent through a first transmission resource within the target time unit; receiving the feedback information corresponding to the second channel group sent through a second transmission resource within the target time unit, where the first transmission resource and the second transmission resource do not overlap, the first transmission resource is determined according to the first DCI, or the first transmission resource is determined according to a number of the feedback information bits corresponding to the first channel group and the first DCI; the second transmission resource is determined according to the second DCI, or the second transmission resource is determined according to the number of the feedback information bits corresponding to the second channel group and the second DCI OK.

In some example embodiments of the present disclosure, based on the foregoing solution, the second channel group does not include the first channel group, and the receiving the target feedback information sent within the target time unit includes: receiving the target feedback information sent through the second channel within the target time unit, where the first transmission resource overlaps the second transmission resource, and the first transmission resource is determined according to the first DCI, or the first transmission resource is determined according to the number of the feedback information bits corresponding to the first channel group and the first DCI; the second transmission resource is determined according to the second DCI, or the second transmission resource is determined according to the number of the feedback information bits corresponding to the second group and the second DCI.

In some example embodiments of the present disclosure, based on the foregoing solution, the second channel group does not include the first channel group, and the receiving the target feedback information sent within the target time unit includes: receiving the target feedback information sent through the a transmission resource within the target time unit, where the target feedback information further includes the feedback information corresponding to the first channel group, and the third transmission resource is determined according to the total number of the target feedback information bits and the second DCI, the first transmission resource overlaps the second transmission resource, the first transmission resource is determined according to the first DCI, and the second transmission resource is determined according to the number of the feedback information bits corresponding to the second channel group and the second DCI.

Figure 10:
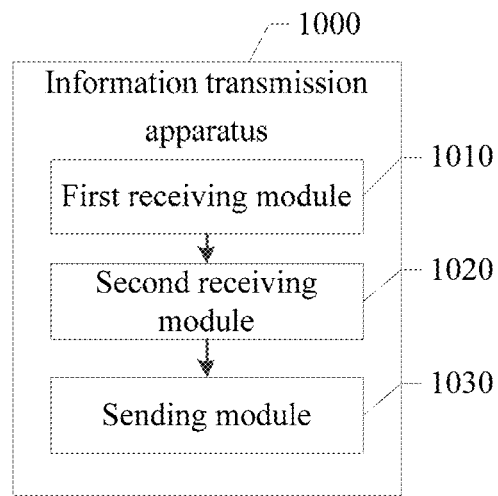
FIG. 10 is a schematic structural diagram of a first embodiment of an information transmission apparatus provided by an embodiment of the present disclosure.

FIG. 10 is a schematic structural diagram of a first embodiment of an information transmission apparatus according to an embodiment of the present disclosure. As shown in FIG. 10, the information transmission apparatus 1000 is applied to a terminal device, and the information transmission apparatus 1000 includes: a first receiving module 1010, configured to receive a first downlink control information DCI, the first DCI indicates the terminal device to send feedback information corresponding to a first channel group within a target time unit; a second receiving module 1020, configured to receive a second DCI, the second DCI indicates the terminal device to send feedback information corresponding to a second channel group within the target time unit; a sending module 1030, configured to send target feedback information within the target time unit, where the target feedback information includes the feedback information corresponding to the second channel group.

In some example embodiments of the present disclosure, based on the foregoing solution, receiving time of the second DCI is after the receiving time of the first DCI.

In some example embodiments of the present disclosure, based on the foregoing solution, the second channel group includes the first channel group.

In some example embodiments of the present disclosure, based on the foregoing solution, the second DCI is one of DCI format 1_1, DCI format 1_2, DCI format 0_1, and DCI format 0_2.

In some example embodiments of the present disclosure, based on the foregoing solution, the second channel group does not include the first channel group, and the target feedback information further includes the feedback information corresponding to the first channel group.

In some example embodiments of the present disclosure, based on the foregoing solution, the apparatus further includes: a first channel determining module, configured to determine a target transmission resource according to the second DCI, where the target transmission resource is located within the target time unit in a time domain, the target transmission resource is used to send the target feedback information.

In some example embodiments of the present disclosure, based on the foregoing solution, the apparatus further includes: a second channel determining module, configured to determine the target transmission resource according to a number of the target feedback information bits and the second DCI, where the target transmission resource is located within the target time unit in the time domain, and the target transmission resource is used to send the target feedback information.

In some example embodiments of the present disclosure, based on the foregoing solution, the second channel group does not include the first channel group, the target feedback information further includes feedback information corresponding to the first channel group, and the sending module includes: a first sending unit, configured to send the feedback information corresponding to the first channel group through a first transmission resource within the target time unit if the first transmission resource and the second transmission resource do not overlap; a second sending unit, configured to send the feedback information corresponding to the second channel group through a second transmission resource within the target time unit, where the first transmission resource is determined according to indication information in the first DCI, or the first transmission resource is determined according to the number of the feedback information bits corresponding to the first channel group and the indication information in the first DCI, and the second transmission resource is determined according to the indication information in the second DCI, or the second transmission resource is determined according to the number of the feedback information bits corresponding to the second channel group and the indication information in the second DCI.

In some example embodiments of the present disclosure, based on the foregoing solution, the second channel group does not include the first channel group, the sending module includes: a third sending unit, configured to send the target feedback information through the second transmission resource within the target time unit the first transmission resource overlaps the second transmission resource, where the first transmission resource is determined according to the indication information in the first DCI, or the first transmission resource is determined according to the number of the feedback information bits corresponding to the first channel group and the indication information in the first DCI, the second transmission resource is determined according to the indication information in the second DCI, or the second transmission resource is determined according to the number of the feedback information bits corresponding to the second channel group and the indication information in the second DCI.

In some example embodiments of the present disclosure, based on the foregoing solution, the second channel group does not include the first channel group, the sending module includes: a fourth sending unit, configured to send the target feedback information through a third transmission resource within the target time unit if the first transmission resource overlaps the second transmission resource, and the target feedback information further includes the feedback information corresponding to the first channel group, the first transmission resource is determined according to the indication information in the first DCI, the second transmission resource is determined according to the number of the feedback information bits corresponding to the second channel group and the indication information in the second DCI, and the third transmission resource is determined according to a total number of the target feedback information bits and the indication information in the second DCI.

The information transmission apparatus provided by any of the foregoing embodiments is used to implement the technical solution on the terminal device side in any of the foregoing method embodiments, and its implementation principles and technical effects are similar, which will not be repeated herein.

Figure 11:
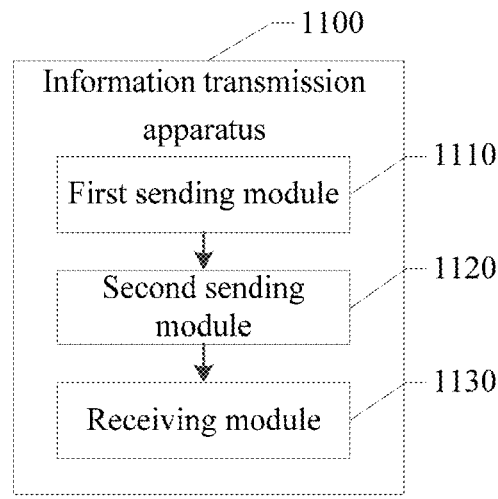
FIG. 11 is a schematic structural diagram of a second embodiment of an information transmission apparatus provided by an embodiment of the present disclosure.

FIG. 11 is a schematic structural diagram of a first Embodiment of an information transmission apparatus according to an embodiment of the application. As shown in FIG. 11, the information transmission apparatus 1100 is applied to a network device, and the information transmission apparatus 1100 includes: a first sending module 1110, configured to send a first downlink control information DCI, the first DCI indicates a terminal device to send feedback information corresponding to a first channel group within a target time unit; a second sending module 1120, configured to send a second DCI, the second DCI indicates the terminal device to send the feedback information corresponding to a second channel group within the target time unit, and a receiving module 1130, configured to receive target feedback information sent within the target time unit, where the target feedback information includes the feedback information corresponding to the second channel group.

In some example embodiments of the present disclosure, based on the foregoing solution, transmission time of the second DCI is after the transmission time of the first DCI.

In some example embodiments of the present disclosure, based on the foregoing solution, the second channel group includes the first channel group.

In some example embodiments of the present disclosure, based on the foregoing solution, the second DCI is one of DCI format 1_1, DCI format 1_2, DCI format 0_1, and DCI format 0_2.

In some example embodiments of the present disclosure, based on the foregoing solution, the second channel group does not include the first channel group, and the target feedback information further includes the feedback information corresponding to the first channel group.

In some example embodiments of the present disclosure, based on the above solution, the receiving module includes: a first receiving unit, configured to receive the target feedback information sent through a target transmission resource, the target transmission resource is determined according to the second DCI, and the target transmission resource is located within a target time unit in a time domain.

In some example embodiments of the present disclosure, based on the foregoing solution, the receiving module includes: a second receiving unit, configured to receive the target feedback information sent through the target transmission resource, the target transmission resource is determined according to a number of the target feedback information bits and the second DCI, and the target transmission resource is located within the target time unit in the time domain.

In some example embodiments of the present disclosure, based on the foregoing solution, the second channel group does not include the first channel group, the target feedback information further includes the feedback information corresponding to the first channel group, and the receiving module includes: a third receiving unit, configured to receive the feedback information corresponding to the first channel group sent through a first transmission resource within the target time unit; a fourth receiving unit, configured to receive the feedback information corresponding to the second channel group sent through a second transmission resource within the target time unit, where the first transmission resource and the second transmission resource do not overlap, and the first transmission resource is determined according to the first DCI, or the first transmission resource is determined according to the number of the feedback information bits corresponding to the first channel group and the first DCI, the second transmission resource is determined according to the second DCI, or the second transmission resource is determined according to the number of the feedback information bits corresponding to the second channel group and the second DCI.

In some example embodiments of the present disclosure, based on the foregoing solution, the second channel group does not include the first channel group, and the receiving module includes: a fifth receiving unit, configured to receive the target feedback information sent through the second transmission resource within the target time unit, where the first transmission resource overlaps the second transmission resource, the first transmission resource is determined according to the first DCI, or the first transmission resource is determined according to the number of the feedback information bits corresponding to the first channel group and the first DCI, the second transmission resource is determined according to the second DCI, or the second transmission resource is determined according to the number of the feedback information bits corresponding to the second channel group and the second DCI.

In some example embodiments of the present disclosure, based on the foregoing solution, the second channel group does not include the first channel group, and the receiving module includes: a sixth receiving unit, configured to receive the target feedback information sent through a third transmission resource within the target time unit, where the target feedback information further includes the feedback information corresponding to the first channel group, and the third transmission resource is determined according to a total number of the target feedback information bits and the second DCI, the first transmission resource overlaps the second transmission resource, the first transmission resource is determined according to the first DCI, and the second transmission resource is determined according to the number of the feedback information bits corresponding to the second channel group and the second DCI.

The information transmission apparatus provided in any of the foregoing embodiments is used to implement the technical solution on the network device side in any of the foregoing method embodiments, and its implementation principles and technical effects are similar, which will not be elaborate herein.

Figure 12:
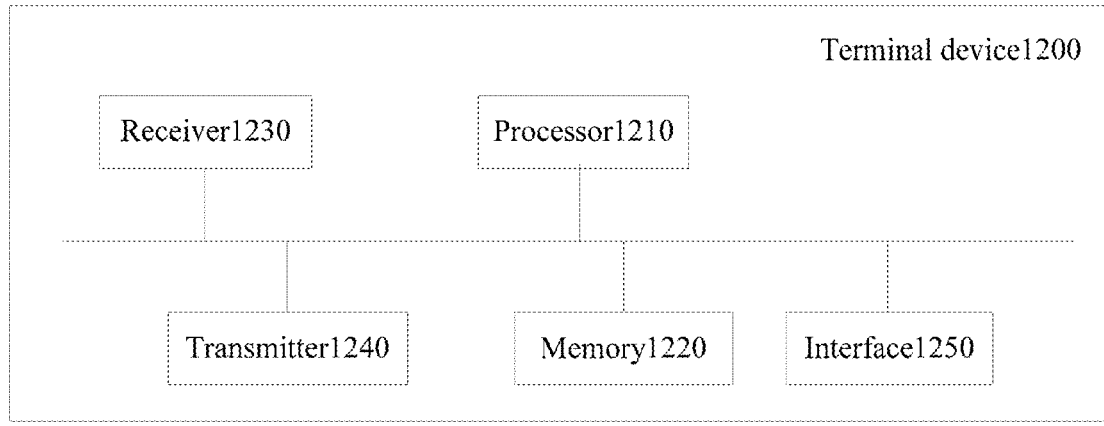
FIG. 12 is a schematic structural diagram of a first embodiment of a terminal device provided by an embodiment of the present disclosure.

FIG. 12 is a schematic structural diagram of a first embodiment of a terminal device according to an embodiment of the present disclosure. As shown in FIG. 12, the terminal device 1200 includes:

a processor 1210, a memory 1220, a receiver 1230 and an interface 1250 for communicating with a network device; in an implementation, the terminal device 40 further includes a transmitter 1240;

the memory 1220 stores computer-executable indications;

the processor 1210 executes the computer-executable indications stored in the memory, enables the processor 1210 to execute the technical solution on the terminal device side in any of the foregoing method embodiments.

Figure 13:
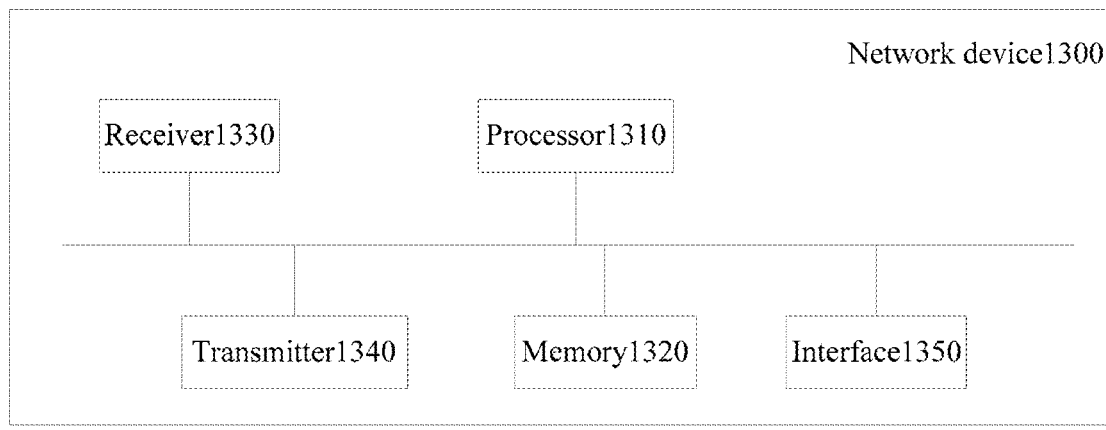
FIG. 13 is a schematic structural diagram of a first embodiment of a network device provided by an embodiment of the present disclosure.

FIG. 13 is a schematic structural diagram of a first embodiment of a network device provided by an embodiment of the present disclosure. As shown in FIG. 13, the network device 1300 includes:

a processor 1310, a memory 1320, a transmitter 1340 and an interface 1350 for communicating with a terminal device; in an implementation, the network device 1300 further includes a receiver 1330;

the memory 1320 stores computer-executable indications;

the processor 1310 executes the computer-executable indications stored in the memory, enables the processor 1310 to execute the technical solution on the network device side in any of the foregoing method embodiments.

In a specific implementation of the terminal device shown in FIG. 12 and the network device described in FIG. 13, the memory, the processor and the interface may be connected by a bus; in an implementation, the memory may be integrated inside the processor.

The present disclosure also provides a computer-readable storage medium in which stores computer-executable indications, and the computer-executable indications are used to implement technical solutions on a terminal device side in any of the foregoing method embodiments when executed by a processor.

The present disclosure also provides a computer-readable storage medium in which stores computer-executable indications, and the computer-executable indications are used to implement technical solutions on a network device side in any of the foregoing method embodiments when executed by a processor.

Embodiments of the present disclosure also provide a computer program product, including program indications, and the program indications are used to implement technical solutions on a terminal device side in the foregoing method embodiments.

Embodiments of the present disclosure also provide a computer program product, including program indications, and the program indications are used to implement technical solutions on a network device side in the foregoing method embodiments.

Embodiments of the present disclosure also provides a chip, including a processing module and a communication interface, and the processing module can execute technical solutions on a terminal device in the foregoing method embodiment.

Further, the chip further includes a storage module (such as a memory), the storage module is used to store indications, the processing module is used to execute the indications stored in the storage module, and an execution of the indications stored in the storage module causes the processing module to execute technical solutions on the terminal device side.

The embodiment of the present disclosure further provides a chip, including a processing module and a communication interface, and the processing module can execute technical solutions on a network device side in the foregoing method embodiment.

Further, the chip further includes a storage module (such as a memory), the storage module is used to store indications, the processing module is used to execute the indications stored in the storage module, and an execution of the indications stored in the storage module causes the processing module to execute technical solutions on the network device side.

In the several embodiments provided in the present disclosure, it should be understood that the disclosed system, apparatus and method may be implemented in other ways. For example, the apparatus embodiments described above are merely illustrative, for example, a division of units is only a logical function division, and there may be other divisions in actual implementation, for example, multiple units or components can be combined or integrated into another system; or some features can be ignored, or not implemented. In addition, the displayed or discussed mutual coupling or direct coupling or communication connection may be indirect coupling or communication connection through some interfaces, apparatus or units, and may be in electrical, mechanical or other forms.

In specific implementations of the foregoing network device and terminal device, it should be understood that a processor may be a central processing unit (CPU), or may be other general-purpose processors, digital signal processor (DSP), application specific integrated circuit (ASIC), and so forth. The general-purpose processor may be a microprocessor or the processor may also be any conventional processor and so forth. Steps of the method disclosed in the present disclosure may be directly embodied as being executed and completed by a hardware processor, or executed and completed by a combination of hardware and software modules in the processor.

All or part of the steps in the foregoing method embodiments can be implemented by a program indication relevant hardware. The foregoing program can be stored in a readable memory. The program executes the steps including the foregoing method embodiments when executed; and the foregoing memory (storage medium) includes: read-only memory (ROM), random access memory (RAM), Flash memory, hard disk, solid state drive, magnetic tape, floppy disk, optical disk and any combination thereof.

What is claimed is:

1. An information transmission method applied to a terminal device, the method comprises:
   receiving a first downlink control information (DCI), wherein the first DCI indicates the terminal device to send feedback information corresponding to a first channel group within a target slot;
   receiving a second DCI, wherein the second DCI indicates the terminal device to send feedback information corresponding to a second channel group within the target slot, wherein the second channel group comprises the first channel group and another channel group;
   sending target feedback information within the target slot, wherein the target feedback information comprises the feedback information corresponding to the second channel group;
   wherein the first DCI contains one bit information, and the one bit information is used to indicate feedback information corresponding to which group of the first channel group the terminal device sends within the target slot; wherein a value of the one bit information being "0" indicates that the terminal device sends feedback information of a group to which a physical downlink shared channel (PDSCH) scheduled by the first DCI belongs within the target slot: wherein a value of the one bit information being "1" indicates that feedback information of two groups of the first channel group is triggered to be transmitted.

2. The method according to claim 1, wherein
   the first channel group is group X or group Y, and the second channel group is group X and group Y.

3. The method according to claim 2, wherein the group X is group 0, and the group Y is group 1; or
   the group X is group 1, and the group Y is group 0.

4. The method according to claim 1, wherein the second DCI is DCI format 1_1.

5. The method according to claim 1, wherein the method further comprises:
   determining a target transmission resource according to the second DCI, wherein the target transmission resource is located within the target slot in a time domain, and the target transmission resource is used to send the target feedback information.

6. The method according to claim 1, wherein the method further comprises:
   determining a target transmission resource according to a number of the target feedback information bits and the second DCI, wherein the target transmission resource is located within the target slot in a time domain, and the target transmission resource is used to send the target feedback information.

7. An information transmission apparatus applied to a terminal device, the apparatus comprises:
   a processor and a memory storing computer-executable instructions, the processor executes the computer-executable instructions stored in the memory, enables the apparatus to:
   receive a first downlink control information (DCI), wherein the first DCI indicates the terminal device to send feedback information corresponding to a first channel group within a target slot;
   receive a second DCI, wherein the second DCI indicates the terminal device to send feedback information corresponding to a second channel group within the target slot, wherein the second channel group comprises the first channel group and another channel group; and
   send target feedback information within the target slot, wherein the target feedback information comprises the feedback information corresponding to the second channel group;
   wherein the first DCI contains one bit information, and the one bit information is used to indicate feedback information corresponding to which group of the first channel group the terminal device sends within the target slot; wherein a value of the one bit information being "0" indicates that the terminal device sends feedback information of a group to which a physical downlink shared channel (PDSCH) scheduled by the first DCI belongs within the target slot; wherein a value of the one bit information being "1" indicates that feedback information of two groups of the first channel group is triggered to be transmitted.

8. The apparatus according to claim 7, wherein
   the first channel group is group X or group Y, and the second channel group is group X and group Y.

9. The apparatus according to claim 8, wherein the group X is group 0, and the group Y is group 1; or
   the group X is group 1, and the group Y is group 0.

10. The apparatus according to claim 7, wherein the second DCI is DCI format 1_1.

11. The apparatus according to claim 7, wherein the apparatus is further enabled to:
    determine a target transmission resource according to the second DCI, wherein the target transmission resource is located within the target slot in a time domain, and the target transmission resource is used to send the target feedback information.

12. The apparatus according to claim 7, wherein the apparatus is further enabled to:
    determine a target transmission resource according to a number of the target feedback information bits and the second DCI, wherein the target transmission resource is located within the target slot in a time domain, and the target transmission resource is used to send the target feedback information.

13. An information transmission apparatus applied to a network device, the apparatus comprises:
    a processor and a memory storing computer-executable instructions, the processor executes the computer-executable instructions stored in the memory, enables the apparatus to:
    send a first downlink control information (DCI), wherein the first DCI indicates a terminal device to send feedback information corresponding to a first channel group within a target slot;
    send a second DCI, wherein the second DCI indicates the terminal device to send feedback information corresponding to a second channel group within the target slot, wherein the second channel group comprises the first channel group and another channel group; and
    receive target feedback information sent within the target slot, wherein the target feedback information comprises the feedback information corresponding to the second channel group;
    wherein the first DCI contains one bit information, and the one bit information is used to indicate feedback information corresponding to which group of the first channel group the terminal device sends within the target slot; wherein a value of the one bit information being "0" indicates that the terminal device sends feedback information of a group to which a physical downlink shared channel (PDSCH) scheduled by the first DCI belongs within the target slot; wherein a value of the one bit information being "1" indicates that feedback information of two groups of the first channel group is triggered to be transmitted.

14. The apparatus according to claim 13, wherein
the first channel group is group X or group Y, the second channel group is group X and group Y.

15. The apparatus according to claim 14, wherein the group X is group 0, and the group Y is group 1; or
the group X is group 1, and the group Y is group 0.

16. The apparatus according to claim 13, wherein the apparatus is further enabled to:
receive the target feedback information sent through a target transmission resource, wherein the target transmission resource is determined according to a number of the target feedback information bits and the second DCI, and the target transmission resource is located within the target slot in a time domain.

17. The apparatus according to claim 13, wherein the apparatus is further enabled to:
receive the target feedback information sent through a target transmission resource, wherein the target transmission resource is determined according to a number of the target feedback information bits and the second DCI, and the target transmission resource is located within the target slot in the time domain.

* * * * *